C. Y. HILTY.
ROTARY-HARROWS.

No. 194,432.  Patented Aug. 21, 1877.

Witnesses:
R. C. Winshall
Jno. K. Smith

Inventor:
Cyrus Y. Hilty
by Bakewell & Kerr
Attys

UNITED STATES PATENT OFFICE.

CYRUS Y. HILTY, OF APOLLO, PENNSYLVANIA, ASSIGNOR TO HIMSELF AND JAMES KIRKWOOD.

IMPROVEMENT IN ROTARY HARROWS.

Specification forming part of Letters Patent No. 194,432, dated August 21, 1877; application filed July 7, 1877.

*To all whom it may concern:*

Be it known that I, CYRUS Y. HILTY, of Apollo, in the county of Armstrong and State of Pennsylvania, have invented a new and useful Improvement in Combined Rotary Harrows; and I do hereby declare the following to be a full, clear, and exact description thereof, reference being had to the accompanying drawings, forming part of this specification, in which—

Figure 1:
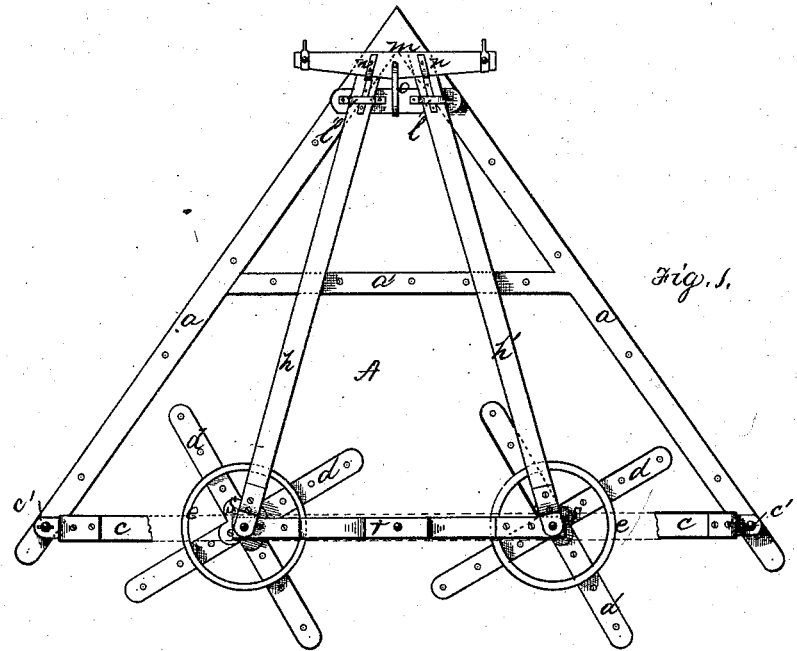
Figure 3:
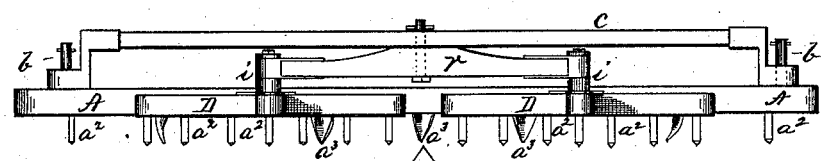
Figure 2:
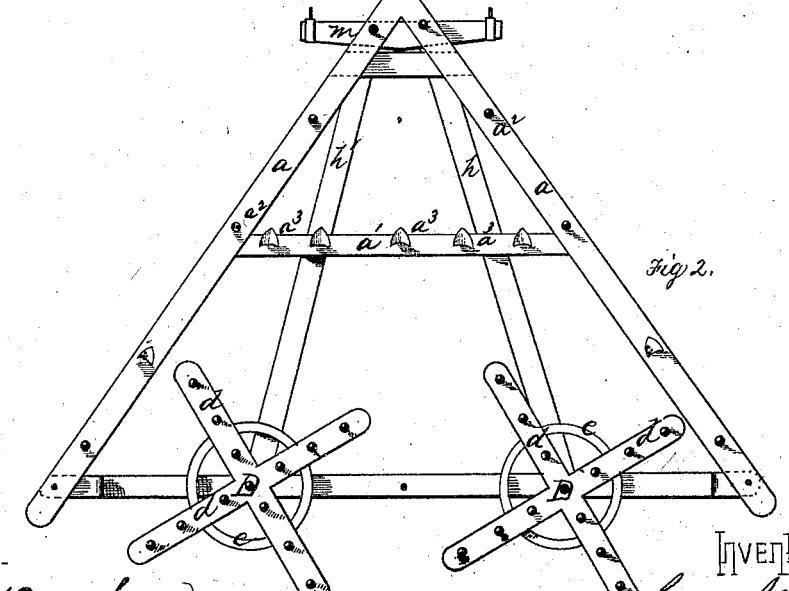

Figure 1 is a top view of a harrow embodying my invention. Fig. 2 is an under-side view of the same, and Fig. 3 is a rear view.

Like letters refer to like parts wherever they occur.

My invention relates to the construction of combined rotary and drag harrows.

It consists, first, in combining a rotary frame or frames with a main or drag frame by means of an automatically-adjustable connecting-bar, which permits the independent adjustment of the parts, so that they may adapt themselves to the inequalities of the surface over which the combined harrow is passing; secondly, in journaling the rotary frames in a coupling-bar pivoted to the main or drag frame, and providing independent draft-bars, whereby the rotary frames have a motion relative to the main frame, but a draft independent thereof, and are capable of adjustment to the draft, as well as the inequalities of the surface; and, thirdly, in combining, with a main frame or drag-frame provided with cultivator-teeth, one or more rotary harrow-frames arranged in rear of the line of cultivator-teeth, whereby seed-furrows are successively formed and closed by the same implement, thereby facilitating the harrowing in of grain, seed, &c.

I will now proceed to describe my invention in detail, so that others skilled in the art to which it appertains may make and use the same.

In the drawing, A indicates the main frame or drag, preferably of A or V form—that is, with the divergent side bars $a\ a$ and an intermediate cross-bar, $a^1$, which are supplied with the usual sharpened bar-teeth $a^2$. Though usually employing square bar-teeth $a^2$ throughout, yet we find it to be preferable, in some cases, to (and therefore do) substitute a series of cultivator-teeth, $a^3$, in the transverse bar $a^1$, as, by first furrowing the ground and then subjecting it to the rotary harrows, the seed is covered more thoroughly and evenly. On the extremity of each divergent side bar $a$ is secured a post or pin, $b$, preferably cast with a spider, by means of which it is secured to bar $a$. Said posts or pins are from nine to fifteen inches long, and serve to secure the adjustable connecting-bar (or cross-bar) $c$.

$c$ indicates a cross or connecting bar, slotted or having holes $c'$ (usually castings with eyes thereon) at each end, which receive the pins or posts $b$, the bar being secured to the main frame A by means of pins or nuts on the extremities of $b$, which permit of the independent rise and fall of the connecting-bar $c$ for from seven to ten inches.

D D are rotary harrows, formed by the cross-pieces $d\ d$, and supplied with the usual harrow-teeth. Each has its arms $d$ braced by the circle $e$, and is provided with a journal, $i$, (preferably a single casting with a spider, $s$, for securing it to the bars $d\ d$,) by which it is journaled in a coupling-bar, $r$, that is in turn pivoted on, or journaled in, the connecting-bar $c$.

Connected to the coupling-bar at points corresponding to the journals of the revolving harrow-frames are two or more draft-bars, $h\ h'$, which converge toward the front of the main frame A, (or apex of the triangle,) pass through the staples $l$ thereon, and are attached to the equalizer or single-tree $m$ by pivot or hinge connections $n$, so that a direct draft is exerted on each rotary harrow, as well as a changeable draft, which latter is of advantage if the rotary harrows clog or their motion is arrested.

In order to obtain direct draft on the main frame A, the equalizer (or single-tree) $m$ is connected thereto by a chain or link, $o$.

The operation of my devices is, in the main, that of a combined drag and rotary harrow, with the following exceptions, and the attendant advantages arising from the modified construction: First, the adjustable connecting-bar permits the rotary frames or revolving harrows to adapt themselves to the surfaces on which they work, and also relatively to, though independent of, the main frame, thus obviating much of the tendency of combined rotary harrows to cramp on the journals and to clog; secondly, the pivoting of the coupling-bar and the independent draft permit the line of draft of each rotary harrow to be changed, so that should it (or they) clog, and cease to rotate on the direct line of draft, the line of draft may be temporarily changed by canting the coupling-bar and equalizer until the harrow is relieved; thirdly, by employing a series of cultivator-teeth on the transverse bar, the clods will be broken by the harrow-teeth which precede them, so that the ground being furrowed by the cultivator-teeth will be in better condition to insure the covering of the seed by the rotary (following) harrow-sections; and, finally, the V or A form of main frame, in combination with the rotary frames, insures the clearance of sticks, stones, stubble, &c.

Having thus described my invention and the advantages thereof, what I claim, and desire to secure by Letters Patent, is—

1. In a combined harrow, the combination of a main or drag frame and one or more rotary frames, connected by an automatically-adjustable bar-connection, substantially as and for the purpose specified.

2. The combination, in a harrow, of the main or drag frame and one or more rotary frames, journaled in a coupling-bar pivoted to the main frame, and provided with an independent draft, substantially as and for the purpose specified.

3. The combination, in a harrow, of A or V frame, provided with a series of cultivator-teeth, arranged transversely, and one or more rotary frames or harrows, arranged in rear of the cultivator-section, substantially as and for the purpose specified.

In testimony whereof I, the said CYRUS Y. HILTY, of Apollo, Armstrong county, and State of Pennsylvania, have hereunto set my hand.

CYRUS Y. HILTY.

Witnesses:
F. W. RITTER, Jr.,
JNO. K. SMITH.